(12) United States Patent
Qi et al.

(10) Patent No.: US 8,013,797 B2
(45) Date of Patent: *Sep. 6, 2011

(54) MOBILE WIRELESS COMMUNICATIONS DEVICE INCLUDING A GROUND PATCH PROVIDING SPECIFIC ABSORPTION RATE (SAR) REDUCTION AND RELATED METHODS

(75) Inventors: Yihong Qi, St. Agatha (CA); Ying Tong Man, Waterloo (CA); Perry Jarmuszewski, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/872,533

(22) Filed: Aug. 31, 2010

(65) Prior Publication Data

US 2010/0328183 A1 Dec. 30, 2010

Related U.S. Application Data

(63) Continuation of application No. 12/472,638, filed on May 27, 2009, now Pat. No. 7,791,547, which is a continuation of application No. 11/733,360, filed on Apr. 10, 2007, now Pat. No. 7,554,496.

(51) Int. Cl.
*H01Q 1/24* (2006.01)
*H01Q 1/48* (2006.01)

(52) U.S. Cl. .................................... 343/702; 343/846
(58) Field of Classification Search .............. 343/702, 343/846, 700 MS
See application file for complete search history.

(56) References Cited

U.S. PATENT DOCUMENTS

| | | | |
|---|---|---|---|
| 6,765,536 B2 | 7/2004 | Phillips et al. | 343/702 |
| 6,819,287 B2 | 11/2004 | Sullivan et al. | 343/700 MS |
| 6,864,842 B2 | 3/2005 | Hung et al. | 343/700 MS |
| 7,397,432 B2 | 7/2008 | Ku et al. | 343/702 |

FOREIGN PATENT DOCUMENTS

| | | |
|---|---|---|
| CA | 2571338 | 3/2007 |
| EP | 0603082 | 6/1994 |
| EP | 1331691 | 7/2003 |
| GB | 2351848 | 1/2001 |
| GB | 2390957 | 1/2004 |
| WO | 2005004277 | 1/2005 |

*Primary Examiner* — Hoang V Nguyen

(74) *Attorney, Agent, or Firm* — Allen, Dyer, Doppelt, Milbrath & Gilchrist, P.A.

(57) ABSTRACT

A mobile wireless communications device may include a portable housing, a dielectric substrate carried by the portable housing having a front side facing toward a user and a back side opposite the front side, and a ground plane carried by the dielectric substrate. The device may further include at least one circuit carried by the dielectric substrate, and an antenna carried by the dielectric substrate adjacent an end thereof and electrically connected to the at least one circuit. A ground patch may be adjacent the front side of the dielectric substrate that is electrically connected to the ground plane and spaced apart from and at least partially overlapping the antenna.

29 Claims, 3 Drawing Sheets

MOBILE WIRELESS COMMUNICATIONS DEVICE INCLUDING A GROUND PATCH PROVIDING SPECIFIC ABSORPTION RATE (SAR) REDUCTION AND RELATED METHODS

This application is a continuation of Ser. No. 12/472,638 filed May 27, 2009, now U.S. Pat. No. 7,791,547 issued Sep. 7, 2010, which is a continuation of Ser. No. 11/733,360 filed Apr. 10, 2007, now U.S. Pat. No. 7,554,496 issued Jun. 30, 2009, the entire disclosures of which are hereby incorporated herein by reference.

FIELD OF THE INVENTION

The present invention relates to the field of communications devices, and, more particularly, to mobile wireless communications devices and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller and thinner devices which are easier and more convenient for users to carry. One challenge this poses for cellular device manufacturers is designing antennas that provide desired operating characteristics within the relatively limited amount of space available for the antenna.

One approach for reducing phone size is to use flip phones having top and bottom housings connected with a hinge. The housings may be closed when the phone is not in use so that it is more compact and easier for a user to carry. One exemplary antenna system for a flip style cellular phone is described in U.S. Pat. No. 6,765,536. In particular, the antenna system includes an external antenna element carried on the top of the lower housing, and a parasitic element carried by the top housing so that when the phone is flipped open the parasitic element is in close proximity to the antenna element. A tuning circuit carried by the lower housing is electrically coupled to the parasitic element. The tuning circuit is variable to adjust the parasitic load on the antenna element to provide variable operating frequencies and bandwidths for the phone.

External cell phone antennas are advantageous in that they are spaced apart from the user's head, which makes it easier for phone manufacturers to comply with applicable specific absorption rate (SAR) requirements, for example. This is because the farther the radiating element of the cell phone antenna system is from the user, the less intense the radiation exposure to the user. Yet, many users prefer internal antennas over external antennas, as external antennas are prone to catch on objects and become damaged, for example. However, with the ever increasing trend towards smaller cell phone sizes, for a relatively small phone having an internal antenna, this may place the antenna in relatively close proximity to the user's ear, which may make complying with applicable SAR and/or hearing aid compatibility (HAC) requirements potentially difficult for manufacturers. This is especially true for smaller and thinner "candy bar" style phones.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime number are used to indicate similar elements in different embodiments.

Generally speaking, a mobile wireless communications device is disclosed herein which may include a portable housing, a dielectric substrate carried by the portable housing having a front side facing toward a user and a back side opposite the front side, and a ground plane carried by the dielectric substrate. The device may further include at least one circuit carried by the dielectric substrate, and an antenna carried by the dielectric substrate adjacent an end thereof and electrically connected to the at least one circuit. Additionally, a ground patch may be adjacent the front side of the dielectric substrate that is electrically connected to the ground plane and spaced apart from and at least partially overlapping the antenna. The ground patch may advantageously reduce a specific absorption rate (SAR) associated with the device by shielding the user from electromagnetic (EM) radiation generated by the antenna in the direction of the user's head. Moreover, this may also advantageously provide desired hearing aid compatibility (HAC).

More particularly, the ground plane may be on the back side of the dielectric substrate. In accordance with one embodiment, the ground patch may be carried by the dielectric substrate. By way of example, the ground patch may have an shape comprising a first member extending outwardly from the dielectric substrate, and a second member extending outwardly from the first member in a direction generally parallel to the dielectric substrate. More specifically, the second member may only partially overlap the antenna. In other embodiments, the ground patch may be carried by the portable housing, for example.

The ground patch may be connected to the ground plane at a plurality of spaced apart contact points. Also, the dielectric substrate may have a lower end and an upper end, and the antenna may be carried adjacent the lower end of the dielectric substrate. The at least one circuit may be a wireless transceiver, such as a cellular transceiver, for example. Additionally, the mobile wireless communications device may further include at least one of a display and a keypad carried by the dielectric substrate on the front surface thereof.

Figure 1:
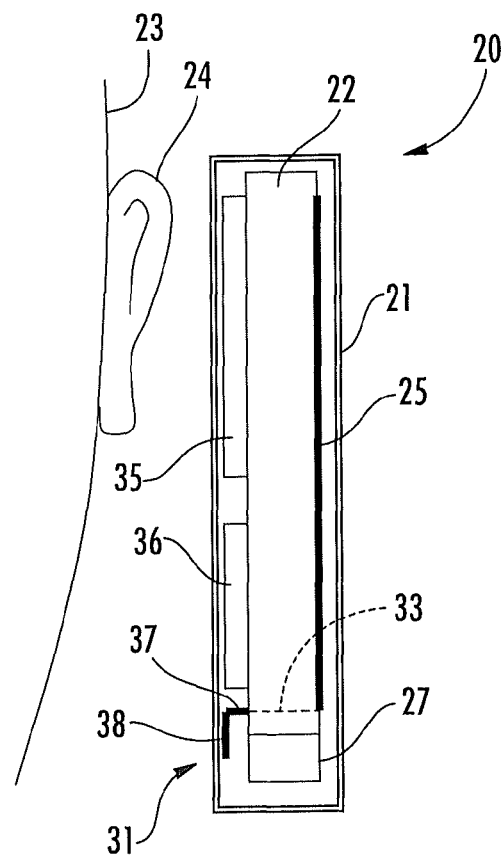
FIG. 1 is a schematic cross-sectional diagram of a mobile wireless communications device including a ground patch in accordance with one exemplary embodiment adjacent a user's ear.
Figure 2:
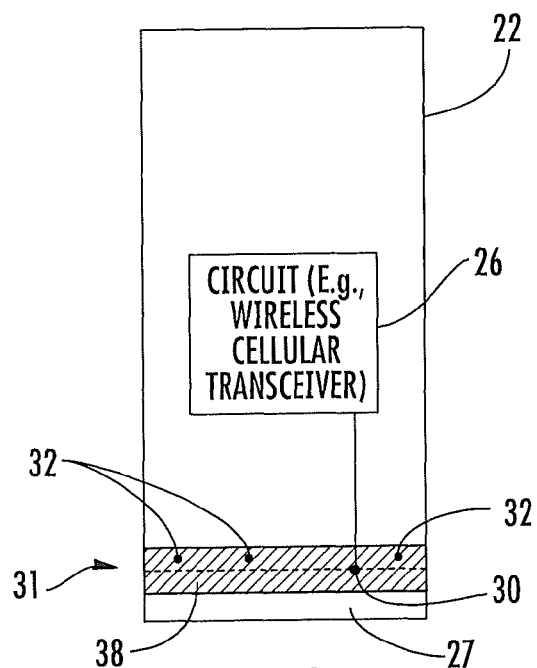
FIG. 2 is a schematic block diagram of the dielectric substrate and ground patch of FIG. 1.

Referring now more particularly to FIGS. 1 and 2, a mobile wireless communications device 20, such as a cellular communications device, for example, is first described. The device 20 illustratively includes a portable housing 21 and a dielectric substrate 22, such as a printed circuit board (PCB), carried by the portable housing. The dielectric substrate 22 has a front side facing toward a user 23 when the device 20 is placed adjacent the user's ear 24 to engage in a telephone conversation, and a back side opposite the front side. In the illustrated example, the device 20 further illustratively includes a display 35 (e.g., a liquid crystal display (LCD)) and a keypad 36 carried by the dielectric substrate 22 on the front surface thereof.

A ground plane 25 is carried by the dielectric substrate 22, which in the illustrated embodiment is on the back side thereof. The device 20 further illustratively includes a circuit(s) 26 carried by the dielectric substrate 22, such as a wireless cellular transceiver, for example. Of course, it will be appreciated that other circuitry may also be included, as will be discussed further below. An antenna 27 is also carried by the dielectric substrate 22 adjacent an end thereof and electrically connected to the circuit 26 at a contact point 30. By way of example, the antenna 27 may include one or more conductive traces (e.g., printed circuit traces) on the dielectric substrate 22. In some embodiments, additional risers or antenna retainer frames may be used to increase the surface area of the antenna, as well as wrapping of conductive traces around different sides/ends of the dielectric substrate 22, as will be appreciated by those skilled in the art.

In the illustrated embodiment, the antenna 27 is adjacent the lower end of the substrate (i.e., where the microphone (not shown) of the cellular device would typically be located). However, in other embodiments, the antenna 27 could be positioned adjacent the upper end of the dielectric substrate 22. Positioning the antenna 27 adjacent the bottom of the device 20 may advantageously help achieve a relatively wide bandwidth and relatively high antenna gain. However, this may also result in a more omni-directional antenna radiation pattern, which in turn can increase the SAR of the device 20 as more radiation is directed toward the user 23 than would be the case with a directional antenna having a boresight pointed away from the user, as will be appreciated by those skilled in the art.

To help reduce the increased SAR resulting from the omni-directional EM radiation of the antenna 27, a ground patch 31 may advantageously be positioned adjacent the front side of the dielectric substrate 22 and spaced apart from and at least partially overlapping the antenna 27. The ground patch 31 is electrically connected to the ground plane 25. More particularly, in the illustrated embodiment electrical contact occurs at a plurality of spaced-apart contact points 32 on the dielectric substrate 22, which are connected to the ground plane 25 by respective vias 33. It should be noted, however, that different electrical connection arrangements may be used in different embodiments, including one or more contact points and wrap-around connections instead of vias passing through the dielectric substrate 22, for example. Moreover, in some embodiments the ground plane 25 may be located on the same side of the dielectric substrate 22 as the ground patch 31. It should be noted that the ground patch 31 is shown with hatching in FIG. 2 for clarity of illustration, although this element is not being shown in section.

The ground patch 31 advantageously reduces a specific absorption rate (SAR) associated with the device 20 by shielding the user from electromagnetic (EM) radiation generated by the antenna in the direction of the user's head. Moreover, this may also advantageously provide desired hearing aid compatibility (HAC), as will be appreciated by those skilled in the art.

In the present example, the ground patch 31 is illustratively carried by the dielectric substrate 22 and has an L-shape comprising a first member 37 extending outwardly from the dielectric substrate, and a second member 38 extending outwardly from the first member in a direction generally parallel to the dielectric substrate (see FIG. 1). More specifically, the second member 38 may only partially overlap the antenna, as shown in FIGS. 1 and 2. By way of example, a height of the antenna 27 may preferably be about 15 mm or less, and a length of the second member 38 may be from about 1 to 15 mm. Moreover, the height of the first member 37 may typically be about 1 to 5 mm, although other dimensions may also be used.

Figure 3:
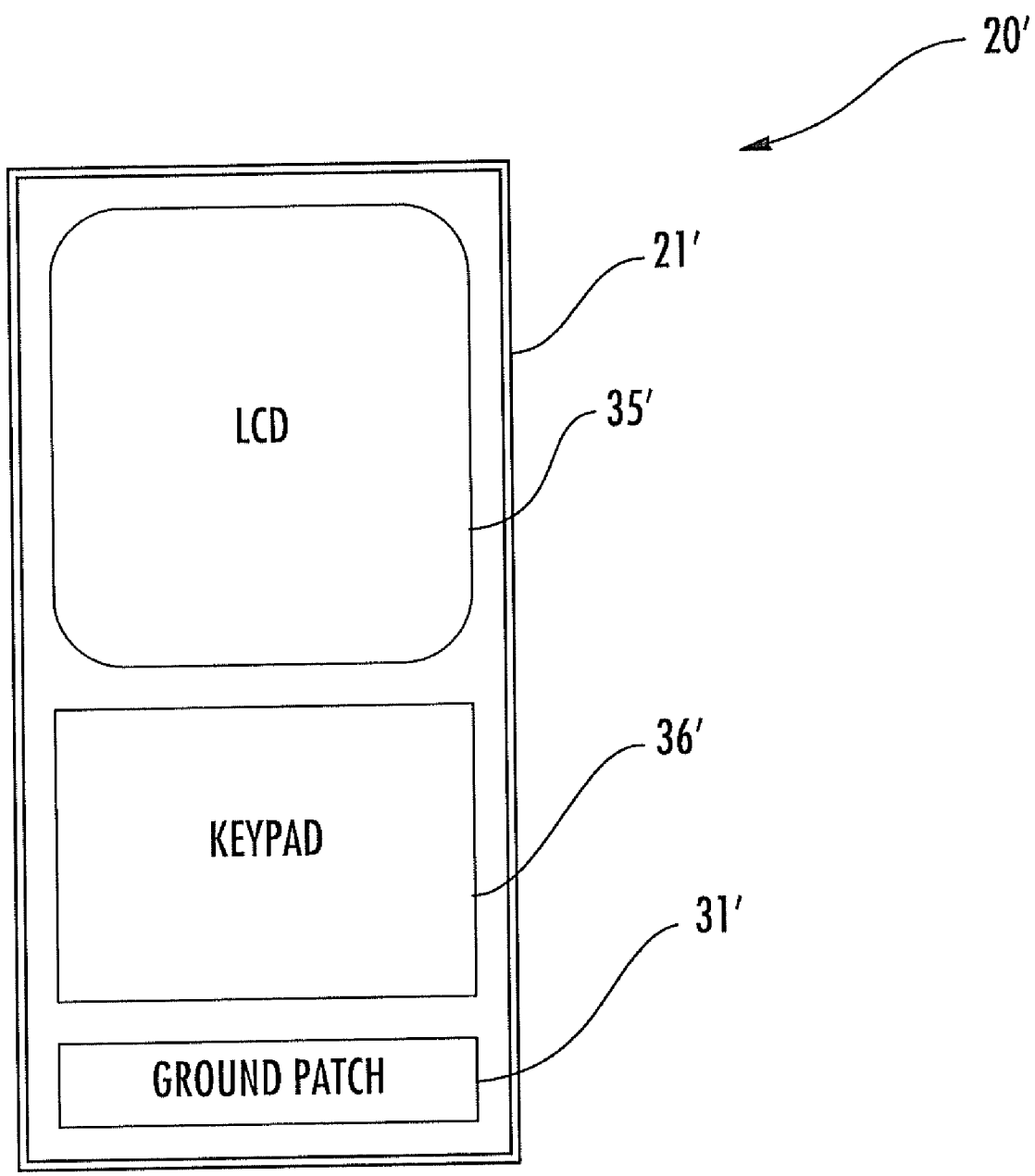
FIG. 3 is a schematic block diagram of an alternative embodiment of the mobile wireless communications device of FIG. 1 in which the ground patch is carried on the exterior of the device housing.

Turning now to FIG. 3, an alternative embodiment of the device 20' is shown in which the ground patch 31' is carried by the portable housing 21'. More particularly, in the illustrated embodiment the ground patch 31' is carried on the outside or exterior of the housing 21'. In this embodiment, the ground patch 31' could have a stylistic appearance. For example, the ground patch 31' could be a piece of metal with a trade name or logo of the device manufacturer or network provider printed or engraved thereon. In other embodiments, the ground patch 31' could be carried on the inside or interior of the housing 21', e.g., carried on an interior surface of the housing.

Exemplary components of a hand-held mobile wireless communications device 1000 that may be included in the above-described devices 20, 20' is further described in the example below with reference to FIG. 4. The device 1000 illustratively includes a housing 1200, a keypad 1400 and an output device 1600. The output device shown is a display 1600, which is preferably a full graphic LCD. Other types of output devices may be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 4:
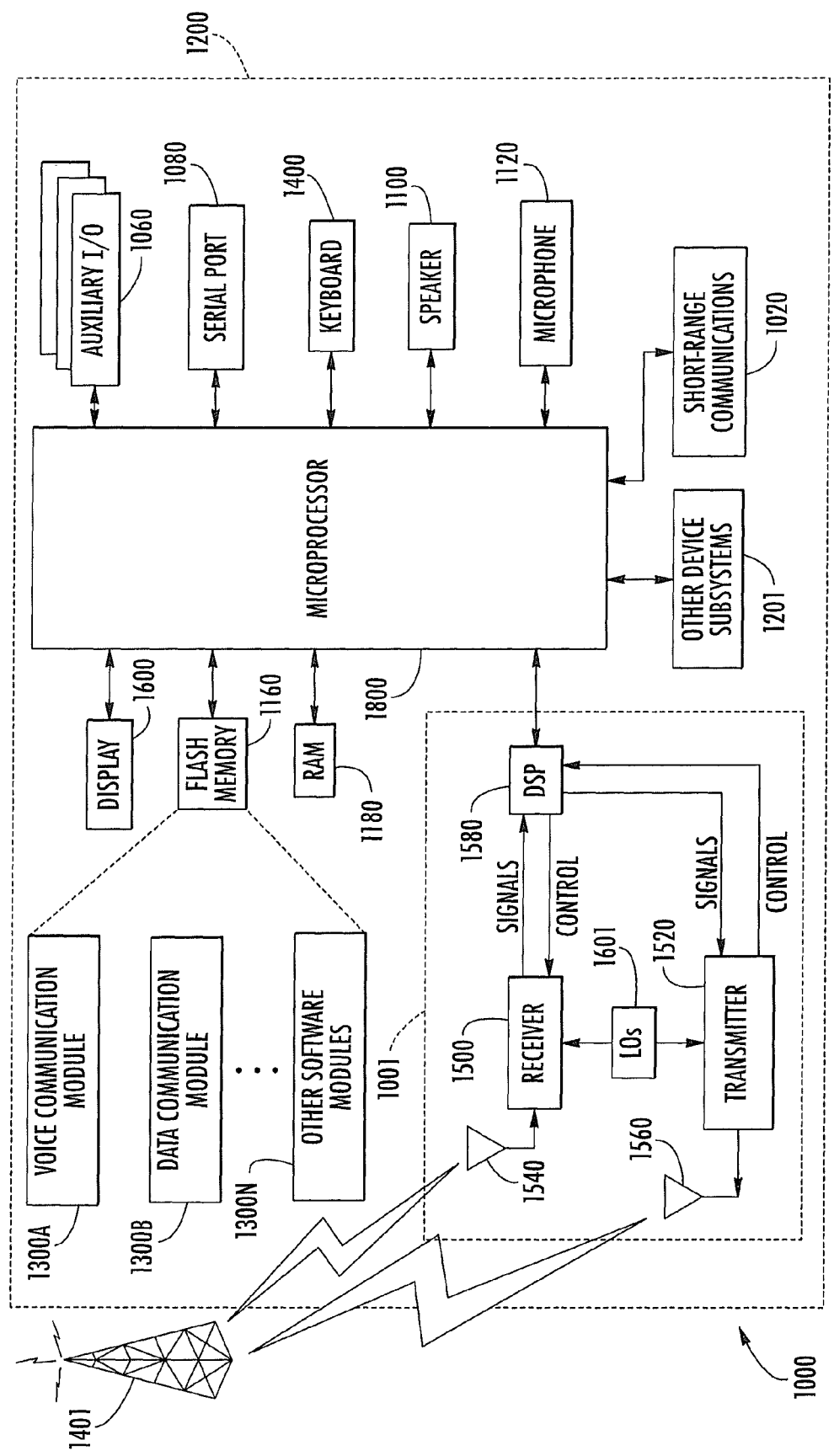
FIG. 4 is a schematic block diagram illustrating further exemplary components that may be used in the mobile wireless communications device of FIG. 1.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
    a portable housing;
    a printed circuit board (PCB) carried by said portable housing and having a front side and a back side opposite the front side, said PCB having a ground;
    an antenna carried by said PCB; and
    a ground patch adjacent the front side of said PCB, being electrically coupled to said ground, and being spaced apart from and at least partially overlapping said antenna so that said antenna lies between the back side of said PCB and said ground patch.

2. The mobile wireless communications device of claim 1 wherein said ground is on the back side of said PCB.

3. The mobile wireless communications device of claim 1 wherein said ground patch is carried by said PCB.

4. The mobile wireless communications device of claim 1 wherein said ground patch only partially overlaps said antenna.

5. The mobile wireless communications device of claim 1 wherein said ground patch is carried by said portable housing.

6. The mobile wireless communications device of claim 1 wherein said ground patch is coupled to said ground at a plurality of spaced apart contact points.

7. The mobile wireless communications device of claim 1 wherein said PCB has a lower end and an upper end, and wherein said antenna is carried adjacent the lower end of said PCB.

8. The mobile wireless communications device of claim 1 further comprising comprises a wireless transceiver circuit carried by said PCB and coupled to said antenna.

9. The mobile wireless communications device of claim 8 wherein said wireless transceiver circuit comprises a cellular transceiver.

10. The mobile wireless communications device of claim 1 further comprising at least one of a display and a keypad carried by said PCB on the front side thereof.

11. A method for reducing a specific absorption rate (SAR) of a mobile wireless communications device comprising a portable housing, a printed circuit board (PCB) carried by the portable housing having a front side and a back side opposite the front side, the PCB having a ground, and an antenna carried by the PCB, the method comprising:
   positioning a ground patch adjacent the front side of the PCB spaced apart from and at least partially overlapping the antenna so that the antenna lies between the back side of the PCB and the ground patch; and
   electrically coupling the ground patch to the ground of the PCB.

12. The method of claim 11 wherein the ground is on the back side of the PCB.

13. The method of claim 11 wherein positioning the ground patch comprises mounting the ground patch on the PCB.

14. The method of claim 11 wherein the ground patch only partially overlaps the antenna.

15. The method of claim 11 wherein positioning the ground patch comprises mounting the ground patch on the portable housing.

16. The method of claim 11 wherein electrically coupling the ground patch to the ground comprises electrically coupling the ground patch to the ground at a plurality of spaced apart contact points.

17. The method of claim 11 wherein the PCB has a lower end and an upper end, and wherein the antenna is carried adjacent the lower end of the PCB.

18. A mobile wireless communications device comprising:
   a portable housing;
   a printed circuit board (PCB) carried by said portable housing having a front side and a back side opposite the front side, said PCB having a ground;
   an antenna carried by said PCB; and
   a ground patch adjacent the front side of said PCB and having at least a portion thereof spaced apart from said PCB, being electrically coupled to said ground, and being spaced apart from and at least partially overlapping said antenna.

19. The mobile wireless communications device of claim 18 wherein said ground is on the back side of said PCB.

20. The mobile wireless communications device of claim 18 wherein said PCB has a lower end and an upper end, and wherein said antenna is carried adjacent the lower end of said PCB.

21. The mobile wireless communications device of claim 18 further comprising a wireless transceiver circuit carried by said PCB and coupled to said antenna.

22. The mobile wireless communications device of claim 21 wherein said wireless transceiver circuit comprises a cellular transceiver.

23. The mobile wireless communications device of claim 18 further comprising at least one of a display and a keypad carried by said PCB on the front side thereof.

24. A mobile wireless communications device comprising:
   a portable housing;
   a printed circuit board (PCB) carried by said portable housing having a front side and a back side opposite the front side, said PCB having a ground;
   an antenna carried by said PCB; and
   a ground patch adjacent the front side of said PCB, being electrically coupled to said ground at a plurality of spaced apart points, and being spaced apart from and at least partially overlapping said antenna.

25. The mobile wireless communications device of claim 24 wherein said ground is on the back side of said PCB.

26. The mobile wireless communications device of claim 24 wherein said PCB has a lower end and an upper end, and wherein said antenna is carried adjacent the lower end of said PCB.

27. The mobile wireless communications device of claim 24 further comprising a wireless transceiver circuit carried by said PCB and coupled to said antenna.

28. The mobile wireless communications device of claim 27 wherein said wireless transceiver comprises a cellular transceiver.

29. The mobile wireless communications device of claim 24 further comprising at least one of a display and a keypad carried by said PCB on the front side thereof.

* * * * *

UNITED STATES PATENT AND TRADEMARK OFFICE
CERTIFICATE OF CORRECTION

| | | |
|---|---|---|
| PATENT NO. | : 8,013,797 B2 | |
| APPLICATION NO. | : 12/872533 | |
| DATED | : September 6, 2011 | |
| INVENTOR(S) | : Qi et al. | |

It is certified that error appears in the above-identified patent and that said Letters Patent is hereby corrected as shown below:

Column 7, Line 9         Delete: "comprises"

Signed and Sealed this
Thirty-first Day of January, 2012

David J. Kappos
*Director of the United States Patent and Trademark Office*